G. H. & J. C. WEBBER.
AGRICULTURAL MACHINE.
APPLICATION FILED FEB. 17, 1912.
1,048,246.
Patented Dec. 24, 1912.
2 SHEETS—SHEET 1.
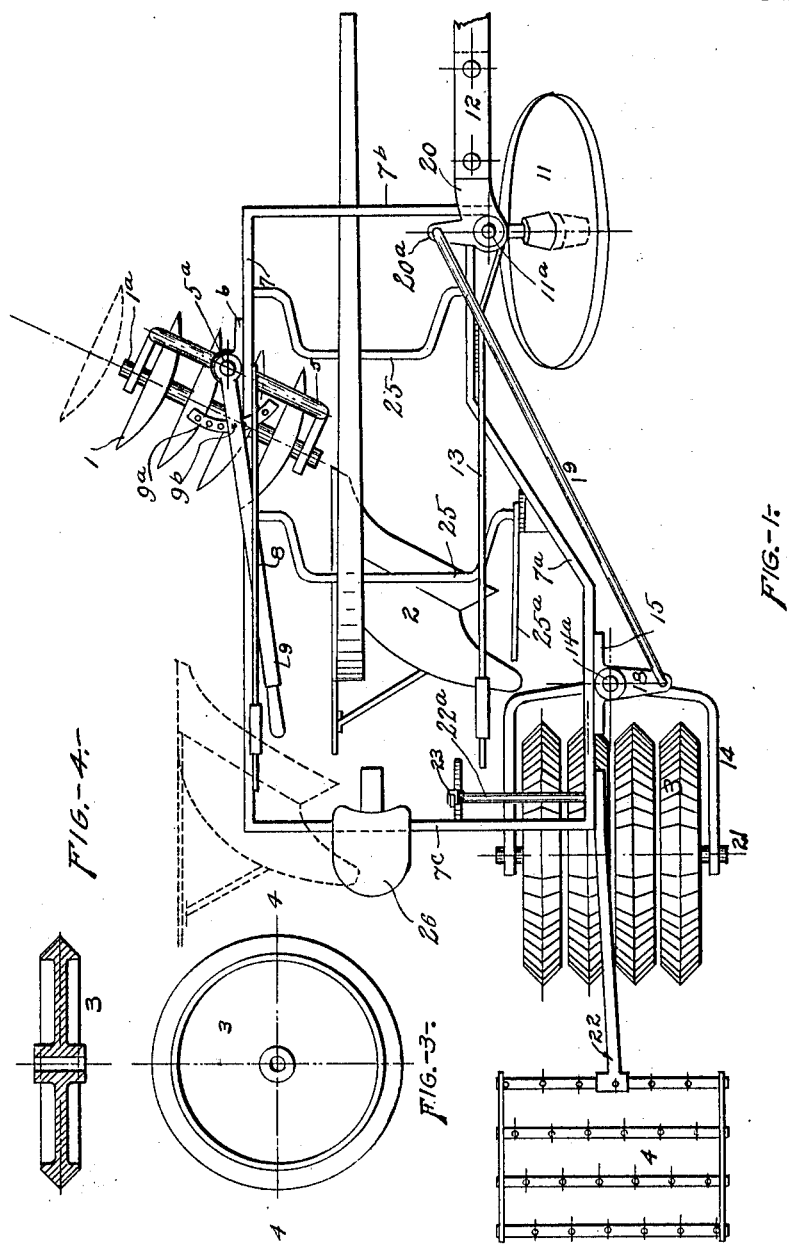
Witnesses.
A. R. Walton
G. Barron
Inventors.
George H. Webber
James C. Webber
per Max A. Schmidt
Attorney G. H. & J. C. WEBBER.
AGRICULTURAL MACHINE.
APPLICATION FILED FEB. 17, 1912.
1,048,246.
Patented Dec. 24, 1912.
2 SHEETS—SHEET 2.
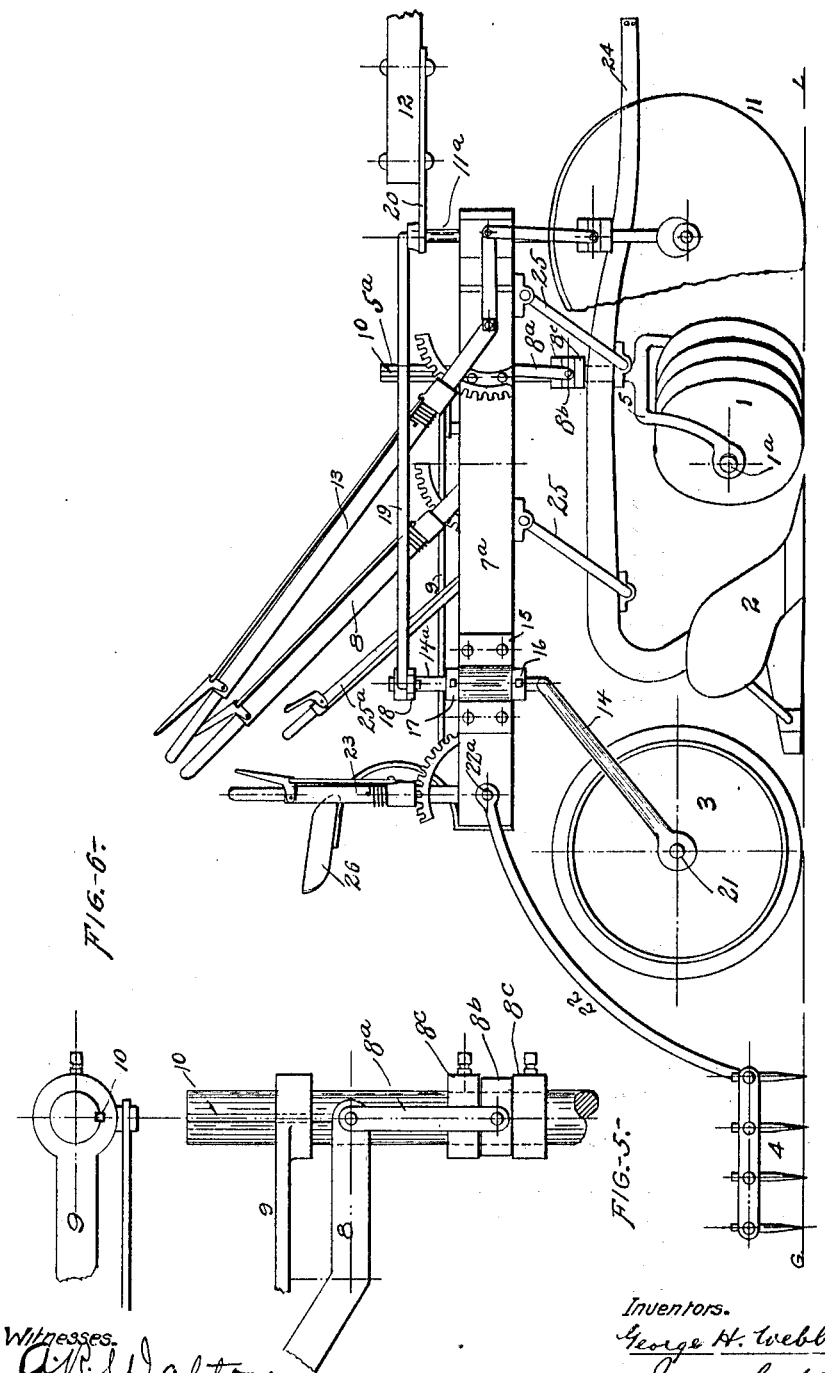

UNITED STATES PATENT OFFICE.

GEORGE H. WEBBER AND JAMES C. WEBBER, OF GRAND ISLAND, NEBRASKA.

AGRICULTURAL MACHINE.

1,048,246.   Specification of Letters Patent.   Patented Dec. 24, 1912.

Application filed February 17, 1912. Serial No. 678,294.

*To all whom it may concern:*

Be it known that we, GEORGE H. WEBBER and JAMES C. WEBBER, citizens of the United States, residing at Grand Island, in the county of Hall and State of Nebraska, have invented certain new and useful Improvements in Agricultural Machines, of which the following is a specification.

The present invention has for its object the accomplishment of dry farming according to the latest practice as established by the experimental stations of the western States of the Union.

Briefly stated, the theory of dry farming, in order to produce the best results, is carried on as follows: The ground should first be disked, and then plowed, following the plowing with a packer, and after this the ground should be thoroughly harrowed. At the present time, with the machines in use, it is necessary for the farmer to travel over the ground four times, first with a disk, then with a plow, next with a packer, and last, with a harrow. With this method, each time the ground is stirred, the pores in it are opened and a large surface is subject to evaporation. The most practical way to practise this dry farming is to disk a small portion of ground, and then perform the other operations in succession so as to reduce the evaporation of moisture contained in the soil to a minimum.

The invention consists in a machine which in one trip over the ground performs all four of the herein-described operations, leaving the soil in a perfect condition for seeding.

The invention also has for its object to provide a machine for the purpose stated which can be easily controlled by one operator, and which is simple and so constructed that side draft is reduced to a minimum.

In order that the invention may be better understood, reference is had to the accompanying drawings, in which—

Figure 1 is a plan view of the machine. Fig. 2 is a side elevation. Fig. 3 is an elevation of one of the packer wheels. Fig. 4 is a section on the line 4—4 of Fig. 3. Fig. 5 is an elevation, and Fig. 6 is a plan view of the device for regulating the disks.

Referring specifically to the drawings, 1 denotes the disks which travel on the untilled soil, thus preparing it for the plow 2.

The packer 3 follows the plow, and the harrow 4 follows the packer.

The frame of the machine comprises side bars 7 and $7^a$, and front and rear bars $7^b$ and $7^c$, respectively. The disks 1 are mounted on an axle $1^a$, carried by a yoke 5, having a vertical stem $5^a$ which is journaled in a bearing 6 on the side bar 7. In order that the gang of disks may be set at different angles to the line of draft there is provided a hand lever 9 which is splined on the stem $5^a$, as indicated at 10, or otherwise connected thereto, so that said stem may be moved up or down to permit vertical adjustment of the disks. Means are provided for locking the hand lever, the same comprising a bar $9^a$ having perforations to receive a pin $9^b$ carried by the hand lever. The gang of disks may be raised or lowered, by hand lever 8, connected by a link $8^a$ to a collar $8^b$ loose on the stem $5^a$, but held against vertical movement thereon by set collars $8^c$. A suitable lock is provided for the hand lever 8. The depth that the plow 2 will enter the ground is regulated by the vertical adjustment of the disks 1, as hereinbefore described, the plow being supported by the frame of the machine in a suitable manner.

The front end of the machine is supported by a furrow-wheel 11, the axle of which has a vertical stem $11^a$ which is swiveled in a suitable bearing carried by the bar $7^a$ so that the furrow-wheel may be swung around to facilitate the turning movement of the machine. To the stem $11^a$ is fastened a bell-crank lever, having one of its branches 20 connected to a draft tongue 12, whereby the swing of the latter, when making turns, is communicated to the furrow-wheel.

The packer comprises a number of disks 3 loosely mounted on an axle 21 carried by the branches 14 of a yoke having a vertical stem $14^a$ which is mounted in a bearing 15 carried by the bar $7^a$, in which bearing the stem is free to turn. The height of the frame of the machine relative to the packer may be adjusted by collars 16 and 17 made fast on the stem above and below the bearing. On the upper end of the stem is made fast a crank arm 18 which is connected by a rod 19 to the other branch $20^a$ of the bell-crank lever which is secured to the stem $11^a$, whereby the swing of the furrow-wheel 11 is communicated to the packer, the latter, however, swinging in the opposite direction from the former. The tread of the packer disks is tapered toward the middle, in view of which said disks have a greater tendency to pack the soil to a greater depth than a packer with a flat tread.

The harrow 4 is of standard construction and is carried by an arm 22 made fast to and projecting rearward from a rock-shaft 22ª provided with a hand-lever 23 for raising and lowering the harrow.

The plow 2 will be drawn from the forward end of its beam 24, and the rest of the equipment is drawn from the frame of the machine by means of the draft tongue 12.

The rear bar 7ᶜ carries a seat 26 for the driver.

The dotted portion of Fig. 1 shows how the machine may be changed to a gang implement, a few sections being added to the harrow, packer and disks, as well as another plow.

As shown in Fig. 1, the disks 1 and the packer 3 are on opposite sides of the machine, and the plow is therebetween, the plow being set to the rear of the disks, and the packer to the rear of the plow. The harrow trails behind the packer. The disks and plow nearly balance, so that side draft is reduced to a minimum; in fact the power usually consumed in side draft will nearly operate the disks.

The plow beam is suspended from the side bars 7 and 7ª by means of crank-shaped hangers 25 to one of which is connected a hand lever 25ª for raising and lowering the beam by rocking said hanger. The plow will be lifted clear of the ground when the machine is not in operation.

For the purpose of adjusting the height of the frame relative to the furrow wheel 11, there is provided a hand lever 13 having a suitable operating connection with the stem 11ª.

It will be noted that the disks 1 are set with their concave sides facing outward toward the land side, whereby a balancing action is produced, which causes the plow to be crowded away from the land, and neutralizes the side thrust of the ground on the mold board of the plow. A further advantage of this arrangement of the disks is that the plow may be turned at the corner more easily.

We claim:

1. In an agricultural machine, a frame, a front furrow wheel having a swiveled axle, a draft tongue connected to the axle, a packer behind the furrow wheel and having a swiveled axle, and a connection between the furrow wheel and packer axles.

2. In an agricultural machine, a frame, a front furrow wheel having a swiveled axle, a bell-crank lever connected to said axle, a draft tongue connected to one branch of the bell-crank lever, a packer behind the furrow wheel, an axle supporting the packer, a swiveled support for the packer axle, a crank arm connected to said support, and a connection between the crank arm and the other branch of the bell-crank lever.

In testimony whereof we affix our signatures in presence of two witnesses.

GEORGE H. WEBBER.
JAMES C. WEBBER.

Witnesses:
A. L. JOSEPH,
W. E. DONNER.

Copies of this patent may be obtained for five cents each, by addressing the "Commissioner of Patents, Washington, D. C."